(12) United States Patent
Frijas

(10) Patent No.: US 9,057,315 B2
(45) Date of Patent: Jun. 16, 2015

(54) OXYGEN SENSOR HEAT SINKING BOSS

(71) Applicant: Rodney M. Frijas, Powell, OH (US)

(72) Inventor: Rodney M. Frijas, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 9 days.

(21) Appl. No.: 13/956,971

(22) Filed: Aug. 1, 2013

(65) Prior Publication Data

US 2015/0007554 A1 Jan. 8, 2015

Related U.S. Application Data

(60) Provisional application No. 61/843,716, filed on Jul. 8, 2013.

(51) Int. Cl.
| | | |
|---|---|---|
| *F01N 5/02* | (2006.01) | |
| *F01N 13/00* | (2010.01) | |
| *G01D 11/30* | (2006.01) | |
| *F02D 41/14* | (2006.01) | |

(52) U.S. Cl.
CPC .............. *F01N 13/008* (2013.01); *G01D 11/30* (2013.01); *F02D 41/1439* (2013.01); *F01N 2260/022* (2013.01); *F01N 2260/20* (2013.01); *F01N 2560/025* (2013.01); *F01N 2590/04* (2013.01)

(58) Field of Classification Search
CPC ............ F01N 13/008; F01N 2560/025; F01N 2590/00; F02D 41/1439
USPC .............................. 60/276, 285, 320; 73/866.5
See application file for complete search history.

(56) References Cited

U.S. PATENT DOCUMENTS

| | | | |
|---|---|---|---|
| 4,617,795 A | 10/1986 | Abthoff et al. | |
| 5,329,806 A | 7/1994 | McClanahan et al. | |
| 5,490,412 A | 2/1996 | Duce et al. | |
| 5,922,938 A | 7/1999 | Hafele | |
| 6,319,376 B1 | 11/2001 | Graser et al. | |
| 6,390,670 B1 * | 5/2002 | Nimberger et al. | 374/142 |
| 6,848,438 B2 | 2/2005 | Celerier et al. | |
| 6,866,517 B2 | 3/2005 | Kimata et al. | |
| 6,957,564 B2 | 10/2005 | Nelson et al. | |
| 7,168,295 B2 | 1/2007 | Yamauchi et al. | |
| 7,197,912 B1 | 4/2007 | Duce et al. | |
| 7,367,419 B2 | 5/2008 | Tsuruta et al. | |
| 7,434,448 B2 | 10/2008 | Weyl et al. | |
| 7,810,375 B2 | 10/2010 | Weyl et al. | |
| 2005/0150707 A1 * | 7/2005 | Tsuruta et al. | 180/309 |
| 2005/0160840 A1 * | 7/2005 | Allmendinger | 73/863.51 |
| 2006/0059683 A1 | 3/2006 | Catalogna et al. | |
| 2010/0000290 A1 | 1/2010 | Goya | |
| 2010/0174455 A1 * | 7/2010 | Powell | 701/51 |
| 2010/0199636 A1 * | 8/2010 | Goya et al. | 60/276 |
| 2011/0239637 A1 * | 10/2011 | Ochsner et al. | 60/320 |
| 2012/0085085 A1 * | 4/2012 | Wright et al. | 60/295 |
| 2012/0160601 A1 * | 6/2012 | Orihashi et al. | 181/228 |
| 2013/0008528 A1 * | 1/2013 | Mitsuda et al. | 137/343 |
| 2013/0011313 A1 * | 1/2013 | Bandl-Konrad et al. | 423/212 |
| 2013/0125533 A1 * | 5/2013 | Sullivan et al. | 60/276 |
| 2014/0237994 A1 * | 8/2014 | Takagi | 60/276 |

* cited by examiner

*Primary Examiner* — Thomas Denion
*Assistant Examiner* — Jorge Leon, Jr.
(74) *Attorney, Agent, or Firm* — Fay Sharpe LLP

(57) ABSTRACT

A vehicle having an engine is disclosed. The vehicle includes an exhaust pipe receiving exhaust gas from the engine and a muffler connected to the exhaust pipe. An oxygen concentration sensor is disposed in a boss defining a port in the exhaust pipe. The boss includes a diameter greater than a widest dimension of the oxygen concentration sensor which may be in the form of a fin.

14 Claims, 4 Drawing Sheets

OXYGEN SENSOR HEAT SINKING BOSS

This application claims the benefit of U.S. application Ser. No. 61/843,716, filed Jul. 8, 2013, the disclosure of which is incorporated by reference.

BACKGROUND

The present exemplary embodiment relates to an exhaust system for a motor vehicle, and particularly to a port receiving a sensor for measuring the amount of oxygen in an exhaust gas. It finds particular application in conjunction with an all-terrain vehicle (hereinafter referred to as "ATV") and will be described with particular reference thereto. However, it is to be appreciated that the present exemplary embodiment is also amenable to other types of vehicles and applications.

The modern internal combustion engine of motor vehicles is equipped with an electronic control system which adjusts the quantity of fuel injected, the quantity of exhaust gas recirculated, etc., on the basis of preprogrammed strategies and as a function of engine operating conditions.

Among the items of information required by the electronic control system in order to determine the operating conditions include the composition and/or the temperature of the exhaust gases and more particularly to the residual oxygen concentration. These items of information relating to the exhaust gases are delivered by appropriate measuring sensors which are disposed along the path of the exhaust gases. These sensors often work according to the principle of an oxygen concentration chain. They normally consist of a pipe containing a solid electrolyte (e.g. $ZrO_2$) which is acted upon by the exhaust gas on one side and by a gas with a known oxygen content on the other side.

Typically, the solid electrolyte requires a working temperature of about 400° to 900°, allowing the sensor to be screwed into the exhaust gas pipe through a port at a point where the exhaust gases have a temperature suitable to heat the probe to its working temperature. In a standard case, the measuring sensor with which the exhaust line is equipped is screwed into an internally threaded housing traversing the wall of the exhaust pipe, in such a way as to bring the analysis cells into contact with the flow of exhaust gases.

FIG. 1 shows a conventional gas sensor 1 of the type typically installed in an exhaust system of an automotive engine to control the air-fuel ratio. The gas sensor 1 includes a sensor element 2 inserted in a cylindrical housing 4, a measured gas cover 6 provided at a distal end side of the housing 4 to cover a distal end side of the sensor element 2, and an atmospheric air cover 8 provided at a proximal end side of the housing 4 to cover a proximal end side of the sensor element 2.

The inside space of the measured gas cover 6 includes a measured gas environment 7, while the inside space of the atmospheric air cover 8 includes an atmospheric air environment 10. The clearance between the sensor element 2 and the housing 4 should be sealed, to isolate environments 7 and 10 from each other. Furthermore, the clearance between the sensor element 2 and the housing 4 should be a watertight seal. Watertight sealing the clearance between the sensor element 2 and the housing 4 prevents fuel liquid from entering from the measured gas environment 7 and also prevents condensate from entering the measured gas environment 7 during an engine stopped condition.

Inorganic powder 12 fills the clearance between the sensor element 2 and the housing 4. An insulator 14 and a metallic ring 16 are disposed on the powder filler 12. The measured gas cover 6 includes an outer cover 18 and an inner cover 20.

The atmospheric air cover 8 includes a main cover member 22 and an outside cover member 24. An atmospheric air side insulator 26 holds the lead wires 28 of the sensor element 2. The lead wires 28 are inserted in an elastic insulating member 30 provided at the proximal end side of the atmospheric air side insulator 26.

The oxygen concentration sensor is disposed in the exhaust pipe which conducts exhaust gas from the engine to a muffler. In the case of a saddle ride type all-terrain vehicle, for example, the engine exhaust pipe may be shielded to reduce heat transmitted to surrounding ATV components. This leads to a corresponding increase in the temperature of the exhaust gas downstream within the exhaust pipe. The oxygen concentration sensor has been found to experience a corresponding increase in temperature into a range that can affect performance.

The present disclosure introduces an oxygen sensor port including a boss design that has been found to advantageously reduce oxygen sensor temperature.

BRIEF DESCRIPTION

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to a first embodiment, an exhaust tube defining an exhaust passage is provided. The exhaust tube includes a port formed in a sidewall and shaped to receive a sensor. The port includes a neck region defining a passage extending outwardly from the tube and having a radially projecting fin.

According to a further embodiment, a gas sensor mounting structure having a boss welded to an exhaust tube is provided. The boss defines a threaded interior passage receiving the gas sensor and at least two radially projecting fins.

According to another embodiment, an all-terrain vehicle having an engine is disclosed. The vehicle includes an exhaust pipe receiving exhaust gas from the engine and a muffler connected to the exhaust pipe. An oxygen concentration sensor is disposed in a boss defining a port in the exhaust pipe. The boss includes a diameter greater than a widest dimension of the oxygen concentration sensor.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated samples, however, are not exhaustive of the many possible embodiments of the disclosure. Other advantages and novel features of the disclosure will be set forth in the following detailed description of the disclosure when considered in conjunction with the drawings, in which.

DETAILED DESCRIPTION

Embodiments of the invention will be described hereinafter with reference to the accompanying drawings. In this detailed description reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
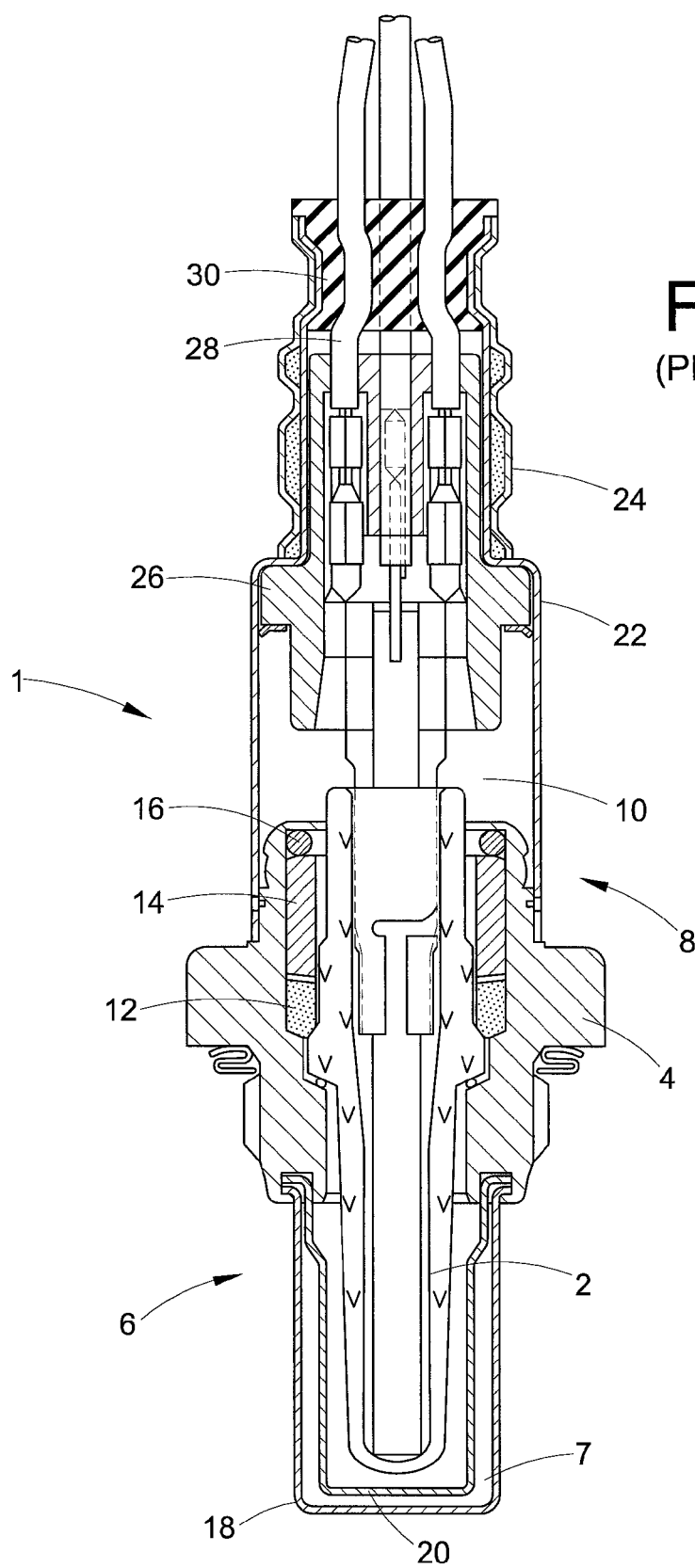
FIG. 1 is a side view of a prior art oxygen concentration sensor in cross-section.
Figure 2:
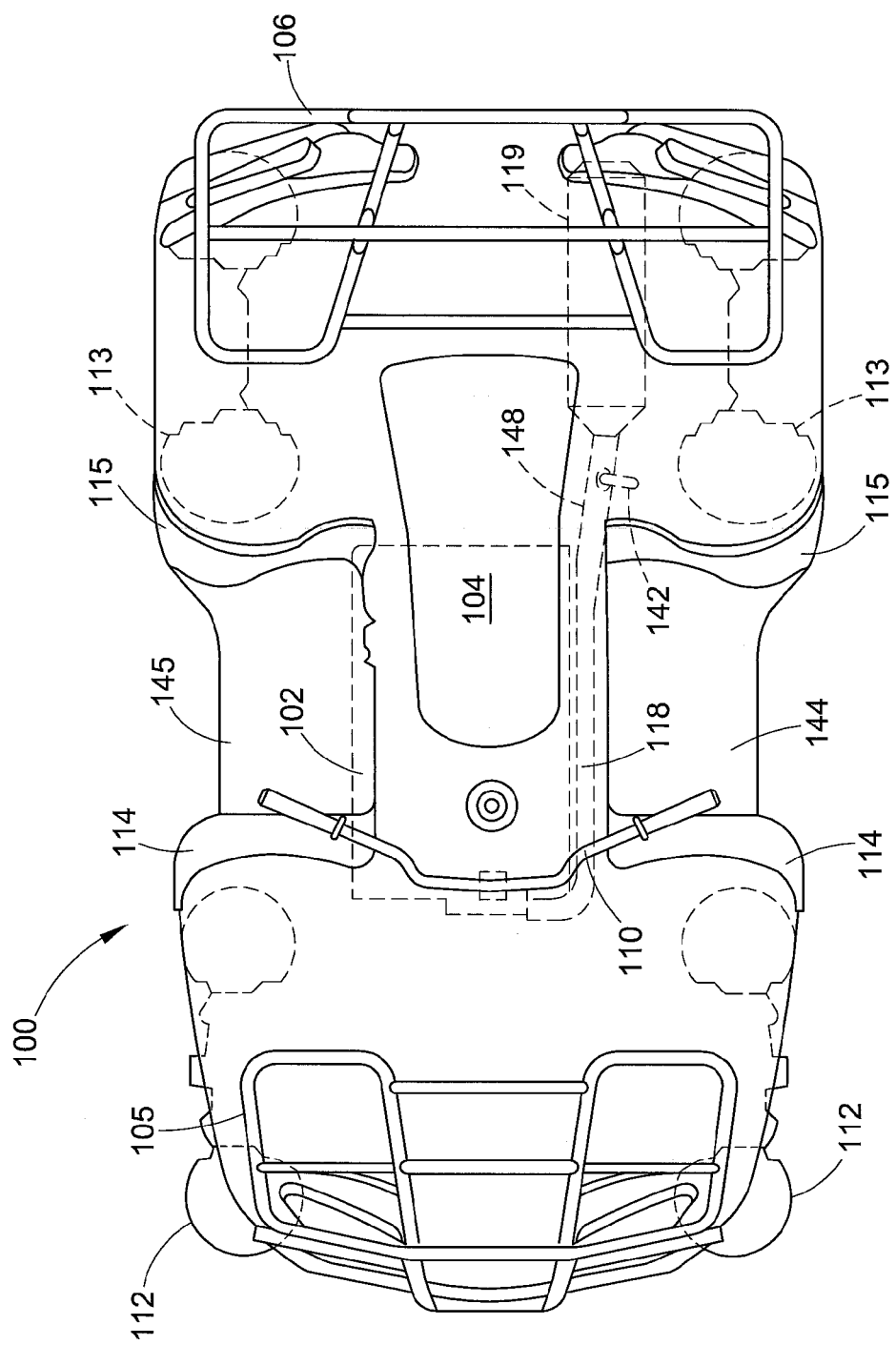
FIG. 2 is a top plan view of an ATV, partially in phantom, according to one embodiment of this disclosure.

Referring now to FIG. 2, an ATV 100 includes an engine 102 located at a central portion of the vehicle body below a rider's seat 104, and between front and rear luggage carriers 105 and 106. A steering handle 110 is provided at an upper portion of the steering shaft (not shown), and a link (not shown) is provided at a lower portion of the steering shaft. The link is connected to front wheels 112 through a connection device (not shown). Rear wheels 113 are provided at rear portions of the vehicle. A front fender 114 and a rear fender 115 including wheel wells are provided on the upper side of the front wheel 112 and the rear wheels 113 so as to cover the wheels 112, 113. Foot rests 144 and 145, which support the feet of the rider seated astride the rider's seat 104 are provided between the front fender 114 and the rear fender 115.

An exhaust pipe 118 exits from the engine 102 front side and extends rearwardly traversing a lateral side of the engine 102. Exhaust pipe 118 is connected to a muffler 119 disposed on the vehicle rear side. An oxygen concentration sensor 142 is provided in the connection region 148 between the exhaust pipe 118 and the muffler 119.

The ATV 100 includes a control system for detecting the air-fuel ratio of an air-fuel mixture combusted in the engine 102 based on the concentration of oxygen in the exhaust gas and determines the amount of fuel to be injected by a fuel injection system based on the detected results (the fuel injection system and the control system are known and are therefore not shown in the figures). The oxygen concentration sensor 142 is provided for detecting the oxygen concentration in the exhaust gas and supplying the detected results to the control system.

Figure 3:
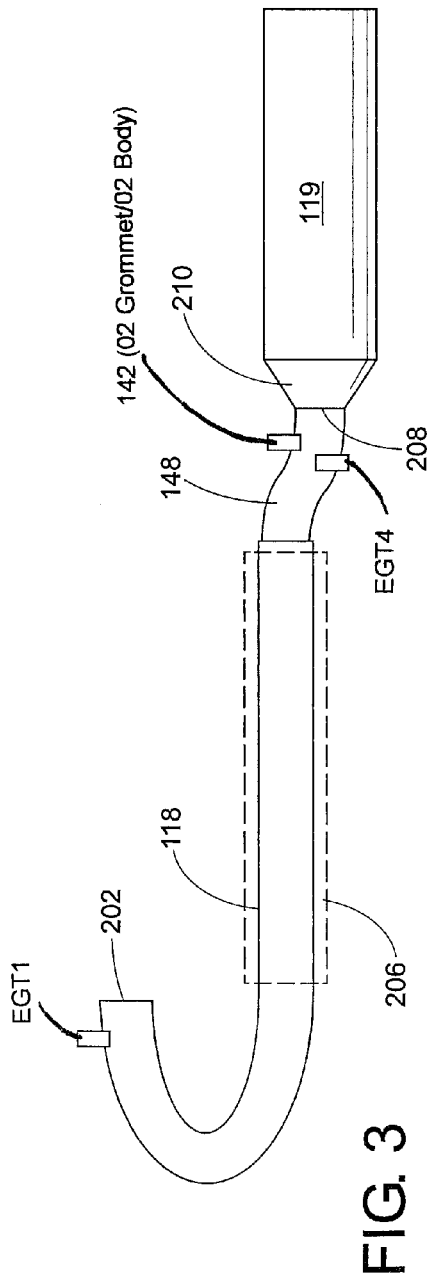
FIG. 3 is a schematic representation of selected exhaust elements of the ATV of FIG. 2.

Referring now to FIG. 3, a schematic illustration of the exhaust configuration of the present disclosure is provided. The exhaust configuration includes the exhaust pipe 118 having a first end 202 configured for mating with the exhaust outlet of the vehicle engine. To isolate selected components of the vehicle from excessive heat, exhaust pipe 118 includes a clam/glass wool 360° shield 206. Exhaust pipe 118 includes connecting region 148 having a second end 208 and a transition zone 210 which forms a connection between the exhaust pipe 118 and the muffler 119. Exhaust pipe connection region 148 receives the oxygen concentration sensor 142.

Figure 4:
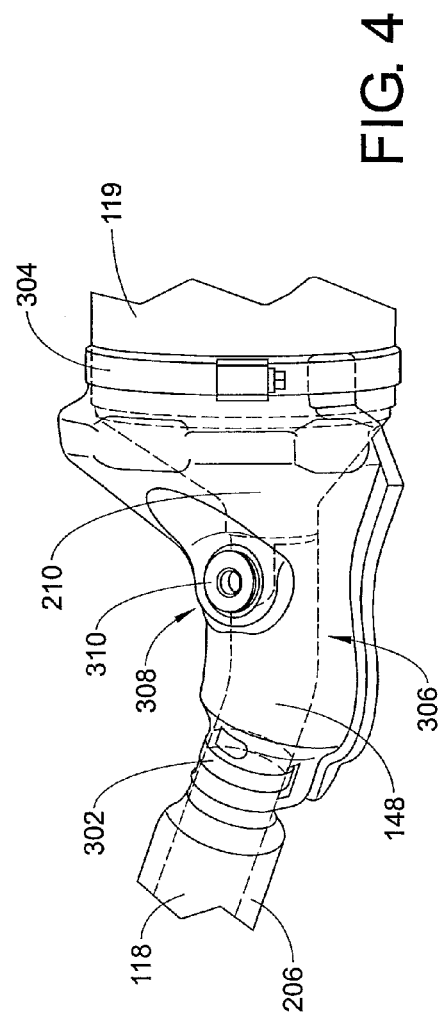
FIG. 4 is a perspective view of the exhaust pipe according to one embodiment of this disclosure.

With reference to FIG. 4, exhaust pipe connection region 148 is secured at a first end via a clamp member 302 to the exhaust pipe 118. Exhaust pipe connection region 148 at the transition zone 210 is secured via a clamp 304 to muffler 119. The exhaust pipe connection region 148 can further include a shield member 306 constructed, for example, of a plastic such as polycarbonate. Shield member 306 can be provided to insulate the surrounding environment from the elevated temperatures of exhaust pipe connection region 148. Shield member 306 can include a passage 308 through which a boss 310 protrudes and/or is accessible to receive the oxygen concentration sensor.

Figure 5:
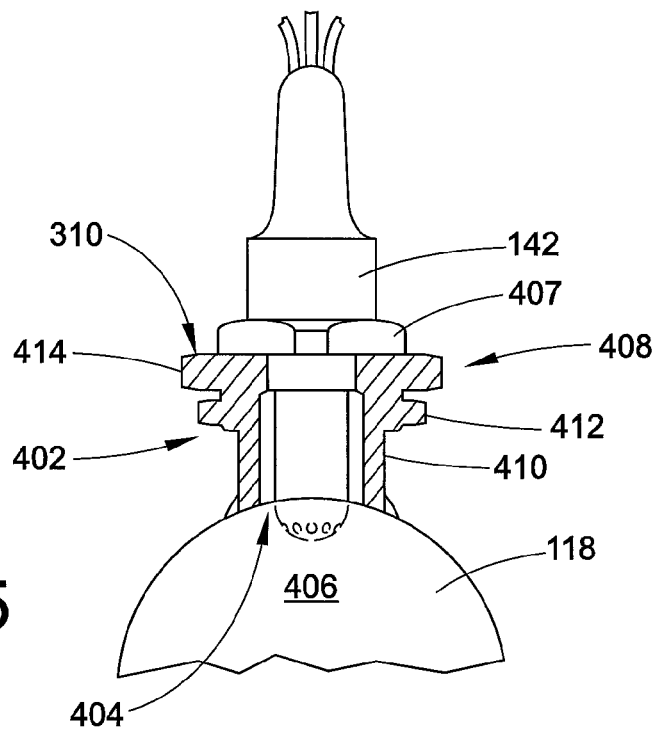
FIG. 5 is a side plan view in cross-section of the oxygen sensor port according to one embodiment of the present disclosure.
Figure 6:
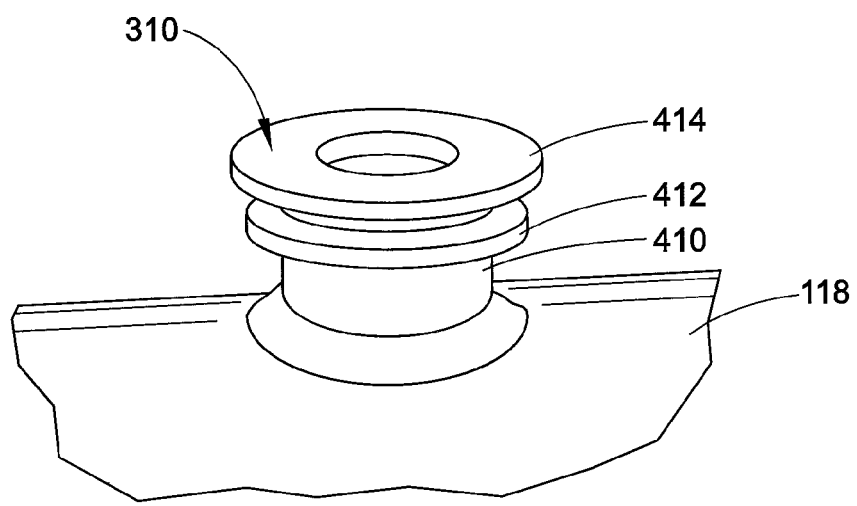
FIG. 6 is a perspective view of the boss of FIG. 5.

Turning now to FIGS. 5 and 6, the boss 310 receiving the oxygen sensor 142 is depicted in detail. Particularly, boss 310 defines a port 402 that provides a passage 404 through which oxygen concentration sensor 142 can penetrate into exhaust pipe 118 to access exhaust gasses located at the interior 406 thereof. Passage 404 can be internally threaded to receive a cooperatively threaded end of the sensor 142. Accordingly, sensor 142 can be threaded into boss 310 until sensor grommet 407 engages an upper surface thereof. Boss 310 includes a neck portion 410 welded to the exhaust pipe 118 and a pair of heat fins 412 and 414. Boss 310 can be comprised of any thermally conductive material that can be physically joined to the exhaust pipe 118. Thermally stable and conductive plastics may be an option as well as metals.

Alternatively, it is envisioned that without heat fins, boss 310 could provide adequate heat sinking provided its diameter is greater than a largest diameter section of the oxygen concentration sensor 142. Moreover, it is envisioned that a boss having a neck portion of sufficient mass as determined by its diameter relative to the oxygen concentration sensor width will demonstrate sufficient dissipation of heat (heat sinking) to allow the sensor to operate in an effective range.

Neck portion 410 can be welded to the exhaust tube 118. Boss 310 can have at least one and alternatively a plurality of heat fins extending radially from neck portion 410. The heat fins can extend in any direction. Similarly, the heat fins can be continuous or discontinuous. For example, the heat fins may include passages or gaps to facilitate air flow.

In one embodiment, the heat fins can be oriented transverse to the longitudinal axis formed by the sensor receiving passage 404, i.e. extend transverse to the neck. Alternatively, the heat fins may be oriented parallel to the longitudinal axis, i.e. run parallel to the neck. In this regard, the orientation of the heat fins may be best determined by the relationship of the longitudinal axis of the passage 404 to geographical horizontal. Particularly, if the longitudinal axis of the passage 404 is geographically vertical, parallel heat fins may be beneficial. If the longitudinal axis of the passage 404 is geographically horizontal, transverse heat fins may be desired. Moreover, since heated air rises, providing heat fins with passages therebetween that are oriented to allow heated air to rise between adjacent heat fins may enhance natural convection and cooling.

It is believed that providing heat fins of different diameter may also be advantageous. For example, in the transverse heat fin arrangement, it may be advantageous for a heat fin further from the exhaust tube to have a diameter greater than a heat fin closer to the exhaust tube. This is depicted in FIGS. 5 and 6 wherein heat fin 414 has a diameter greater than heat fin 412.

EXAMPLES

For comparison purposes, the boss 310 was evaluated relative to a traditional design of the type shown in U.S. Pat. No. 5,329,806. Particularly, with reference to FIG. 3, temperature gauges were positioned at locations EGT1 and EGT4. In addition, the temperature at the O2 grommet and the O2 body were evaluated. As demonstrated in the Table below, the boss, in association with the presently disclosed embodiment, yielded a significant reduction in temperature at the oxygen sensor body (O2 body).

| Condition | EGT1 | EGT4 | O2 Grommet | O2 Body |
|---|---|---|---|---|
| PRIOR ART BOSS | 921 | 663 | 230 | 307 |
| BOSS 310 | 913 | 652 | 219 | 265 |

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An exhaust tube comprising an elongated tube defining an exhaust passage, a port formed in a sidewall of said elongated tube and shaped to receive a sensor, said port comprising a neck region defining an interior passage extending outwardly from said tube, said neck region including at least two radially projecting fins, wherein said radially projecting fins have different diameters.

2. The exhaust tube of claim 1, wherein said radially projecting fins are oriented in a plane transverse to a longitudinal axis of said interior passage.

3. The exhaust tube of claim 1, wherein a first fin is located closer to said elongated tube than a second fin and wherein said second fin has a diameter greater than said first fin.

4. The exhaust tube of claim 1, wherein the elongated tube includes a first region of a substantially constant diameter and a second region including a transition region suitable for engaging a muffler, said port being located in said transition region.

5. The exhaust tube of claim 1, wherein said fin comprises a disc shaped body located at an edge of said neck region remote from the exhaust tube.

6. The exhaust tube of claim 1, wherein said interior passage is threaded.

7. The exhaust tube of claim 1, including a temperature shielding wrap around the elongated tube.

8. A gas sensor mounting structure comprising a boss welded to an exhaust tube, said boss defining a threaded interior passage surface for receiving an associated gas sensor, said boss further including at least two radially projecting fins wherein a first of said fins has a diameter greater than a diameter of a second of said fins.

9. The mounting structure of claim 8, wherein said fins are substantially disc-shaped and oriented in a plane transverse to a longitudinal axis of the interior passage.

10. The mounting structure of claim 8, wherein said second fin is located closer to said exhaust tube than said first fin.

11. An all-terrain vehicle having an engine, said all-terrain vehicle comprising: an exhaust pipe receiving exhaust gas from the engine; a muffler connected to said exhaust pipe; and an oxygen concentration sensor disposed in a boss defining a port in said exhaust pipe, said oxygen concentration sensor penetrating a length of a longitudinal axis of said boss such that an end of the oxygen concentration sensor enters an interior of the exhaust pipe, and wherein said boss includes at least two fins oriented transverse to said longitudinal axis and wherein a fin located further from said exhaust pipe has a diameter greater than a diameter of a fin located closer to said exhaust pipe.

12. The all-terrain vehicle of claim 11, wherein said longitudinal axis is oriented substantially geographically horizontally.

13. The all-terrain vehicle of claim 11, wherein the fin located further from said exhaust pipe is located at a terminus of the boss remote from the exhaust pipe.

14. The all-terrain vehicle of claim 11, wherein said boss includes a main body having a main body diameter adjacent and external to the exhaust pipe and wherein said fins have diameters greater than the main body diameter.

* * * * *